US008301712B1

(12) United States Patent  (10) Patent No.: US 8,301,712 B1
Lu et al. (45) Date of Patent: Oct. 30, 2012

(54) SYSTEM AND METHOD FOR PROTECTING MAIL SERVERS FROM MAIL FLOOD ATTACKS

(75) Inventors: Haw-minn Lu, San Diego, CA (US); Richard Paul White, San Jose, CA (US)

(73) Assignee: Engate Technology Corporation, Reno, NV (US)

( * ) Notice: Subject to any disclaimer, the term of this patent is extended or adjusted under 35 U.S.C. 154(b) by 0 days.

(21) Appl. No.: 13/471,431

(22) Filed: May 14, 2012

Related U.S. Application Data

(63) Continuation of application No. 11/549,645, filed on Oct. 14, 2006, now Pat. No. 8,180,835.

(51) Int. Cl.
G06F 15/16 (2006.01)

(52) U.S. Cl. ...................................... 709/206
(58) Field of Classification Search .................. 709/206
See application file for complete search history.

(56) References Cited

U.S. PATENT DOCUMENTS

| | | |
|---|---|---|
| 5,283,856 A | 2/1994 | Gross et al. |
| 5,377,354 A | 12/1994 | Scannell et al. |
| 5,619,648 A | 4/1997 | Canale et al. |
| 5,826,022 A | 10/1998 | Nielsen |
| 5,999,932 A | 12/1999 | Paul |
| 6,023,723 A | 2/2000 | McCormick et al. |
| 6,052,709 A | 4/2000 | Paul |
| 6,112,227 A | 8/2000 | Heiner |
| 6,199,102 B1 | 3/2001 | Cobb |
| 6,226,668 B1 | 5/2001 | Silverman |
| 6,321,267 B1 | 11/2001 | Donaldson |
| 6,460,050 B1 | 10/2002 | Pace et al. |
| 6,650,890 B1 | 11/2003 | Irlam et al. |
| 6,654,787 B1 | 11/2003 | Aronson et al. |
| 6,732,157 B1 | 5/2004 | Gordon et al. |
| 6,868,498 B1 | 3/2005 | Katsikas |
| 6,941,348 B2 | 9/2005 | Petry et al. |
| 6,965,919 B1 | 11/2005 | Woods et al. |
| 6,986,037 B1 | 1/2006 | Assmann |
| 6,996,606 B2 | 2/2006 | Hasegawa |
| 7,016,939 B1 | 3/2006 | Rothwell et al. |
| 7,146,402 B2 | 12/2006 | Kucherawy |
| 7,249,175 B1 | 7/2007 | Donaldson |
| 7,519,674 B2 | 4/2009 | Regnier |
| 2002/0087641 A1 | 7/2002 | Levosky |

(Continued)

OTHER PUBLICATIONS

Jonathan B. Postel, Simple Mail Transfer Protocol (RFC 821), Aug. 1982, Information Sciences Institute of the University of Southern California.

(Continued)

*Primary Examiner* — Firmin Backer
*Assistant Examiner* — Jonathan Bui
(74) *Attorney, Agent, or Firm* — San Diego IP Law Group LLP (57) ABSTRACT

Most unsolicited commercial email (UCE) countermeasures call for a message by message analysis. However, some UCE attacks occur when a single sender of UCE floods a mail transfer agent (MTA) with a number of copies of a UCE, in a mail flood attack. The attacks rarely rise to the level of denial of service attacks but are significant enough to place a strain on MTAs and anti-UCE countermeasures. The anti-mail flood methodology disclosed herein provides a system and method for protecting mail systems from such mail flood attacks enabling anti-UCE countermeasures to work more efficiently.

20 Claims, 7 Drawing Sheets

U.S. PATENT DOCUMENTS

| | | |
|---|---|---|
| 2002/0091932 A1 | 7/2002 | Shimizu et al. |
| 2002/0162025 A1 | 10/2002 | Sutton et al. |
| 2002/0181703 A1 | 12/2002 | Logan et al. |
| 2002/0199095 A1 | 12/2002 | Bandini et al. |
| 2003/0009698 A1 | 1/2003 | Lindeman et al. |
| 2003/0131063 A1 | 7/2003 | Breck |
| 2003/0167311 A1 | 9/2003 | Kirsch |
| 2003/0187942 A1 | 10/2003 | Quine et al. |
| 2003/0200202 A1 | 10/2003 | Hsiao et al. |
| 2003/0200267 A1 | 10/2003 | Garrigues |
| 2003/0204569 A1 | 10/2003 | Andrews et al. |
| 2003/0220994 A1 | 11/2003 | Zhu |
| 2003/0231207 A1 | 12/2003 | Huang |
| 2004/0015554 A1 | 1/2004 | Wilson |
| 2004/0181571 A1 | 9/2004 | Atkinson et al. |
| 2004/0181585 A1 | 9/2004 | Atkinson et al. |
| 2005/0188028 A1 | 8/2005 | Brown et al. |
| 2006/0031319 A1 | 2/2006 | Nelson et al. |
| 2006/0130147 A1* | 6/2006 | Von-Maszewski ............. 726/25 |
| 2006/0265461 A1 | 11/2006 | Ikegaya et al. |
| 2006/0277264 A1 | 12/2006 | Rainisto |
| 2006/0282894 A1 | 12/2006 | Duffield et al. |
| 2007/0005564 A1 | 1/2007 | Zehner |
| 2007/0124578 A1 | 5/2007 | Paya et al. |
| 2007/0130427 A1 | 6/2007 | Lahti et al. |
| 2007/0280106 A1 | 12/2007 | Lund |
| 2008/0059589 A1 | 3/2008 | Regnier |
| 2008/0320591 A1 | 12/2008 | Fenton et al. |

OTHER PUBLICATIONS

Elisa Batista, When You Send Spam To Yourself, Wired, Jul. 2000.

* cited by examiner

SYSTEM AND METHOD FOR PROTECTING MAIL SERVERS FROM MAIL FLOOD ATTACKS

RELATED APPLICATIONS INFORMATION

This application is a continuation of U.S. patent application Ser. No. 11/549,645, entitled "System and Method for Protecting Mail Servers from Mail Flood Attacks" filed on Oct. 14, 2006, which is incorporated by reference herein in its entirety as if set forth in full.

BACKGROUND OF THE INVENTION

1. Field of Invention

This invention relates to the field of electronic mail (also referred to as email or simply as mail) security and more specifically, to a technique for protecting mail servers from mail flood attacks.

2. Description of Related Art

Unsolicited commercial email (UCE) (colloquially known as spam), viruses, and denial of service attacks threaten computer systems and networks. The problems of UCE and viruses have generally been considered on a single message basis. Most anti-UCE techniques, including content filtering and source interdiction, such as disclosed in commonly owned in U.S. patent application Ser. No. 10/972,765, consider each message separately even though the technique may use a history of electronic mail messages including UCE to better discern UCE from non-UCE. Processing these determinations consumes some resources and time.

A recent technique of spammers (senders of UCE) is to flood a given server with UCE. These attacks are frequently executed in an attempt to circumvent a popular anti-UCE technique known as "tempfailing" or "greylisting." While the anti-UCE techniques used will hopefully catch these messages, the processing of each of these messages consumes valuable resources and time that could be used more efficiently to process legitimate electronic mail messages. Furthermore, spammers employing this technique frequently modify the content of their UCE on each successive attempt in the hope that the variation is sufficient to permit the UCE past the anti-UCE measures of the recipient. While these "mail flood" attacks are persistent they usually do not rise to the frequency that would trigger a denial of service countermeasure.

One method of controlling a mail flood attack is to limit the number of simultaneous connections permitted to the mail server. However, this form of connection throttling has the unintended impact of throttling legitimate attempts to deliver mail. Another variation is to limit the number of simultaneous connections permitted from any single Internet protocol (IP) address. This may limit to some extent the mail flood connections, but experience has shown that most spammers have multiple IP addresses at their disposal. Also, simultaneous mail flood attacks do not occur at such a high frequency that such a restriction would be very useful. A typical attack could be 200-300 messages attempted 10 seconds apart. Additionally, when transmitting to large commercial mail systems, many legitimate email servers attempt to establish many simultaneous connections to those systems. For instance, at any given time, there are many emails traversing between the ebay.com and yahoo.com systems and an intelligent anti-mail flood system needs to account for this.

SUMMARY OF THE INVENTION

The present invention overcomes these and other deficiencies of the prior art by significantly reducing the number of concurrent connections and load on a mail transfer agent. It accomplishes this without inconveniencing any legitimate senders of email since it is applied selectively to hosts with a demonstrated propensity to transmit UCE that have already been sent a failure message and have promptly attempted to resend the message. Such behavior does not conform to mail transfer protocols, is utilized exclusively by hosts attempting to send UCE and is prima facie an indication of a host attempting to send UCE.

Address classes are identified and created from known or suspected UCE. When an email request is received, the IP address from which the request is made is matched against the suspicious address classes. If the IP address is found to be in one of the suspicious address classes the IP address is subject to restriction based on one or more criteria. Typically, if one of the criteria is met, the email request is denied with a temporary failure message.

In one aspect of the invention, one of the criteria is met when the number of connections currently active to the suspicious address class identified with the IP address of the incoming email address reaches a threshold. In another aspect of the invention, one of the criteria is met when the time since the number of connections to the suspicious address class has last reaches the threshold is less than a proscribed interval of time. In another aspect of the invention, one of the criteria is met when the time since any one of the criteria for the suspicious address was last met by an incoming email request is less than a proscribed interval of time.

The address classes can be a predetermined set of address ranges, but they can also be updated based on determinations by an anti-UCE means or content filter. The anti-mail flood attack module described can also be integrated into a mail appliance or more generally a network appliance.

The foregoing, and other features and advantages of the invention, will be apparent from the following, more particular description of the embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION

Further features and advantages of the invention, as well as the structure and operation of various embodiments of the invention, are described in detail below with reference to the accompanying FIGS. 1-7, wherein like reference numerals refer to like elements. The embodiments of the invention are described in the context of electronic mail. Nonetheless, one of ordinary skill in the art readily recognizes that techniques described are applicable to other network protocol and network transactions.

Figure 1:
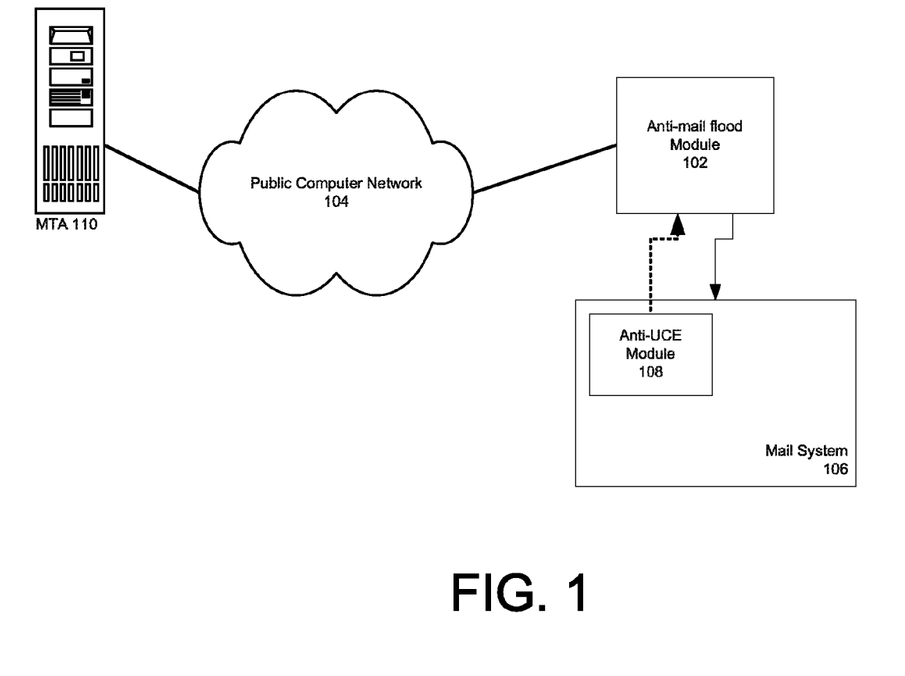
FIG. 1 depicts a typical system for receiving email protected by anti-mail flood module.

FIG. 1 depicts a typical system for receiving email protected by an anti-mail flood module. Though depicted as hardware in FIG. 1, part or all of the system can be integrated into a single piece of hardware and the anti-mail flood module can be implemented in software. Anti-mail flood module 102 interfaces with a public computer network 104, which can typically be the Internet. Anti-mail flood module 102 is also coupled to mail system 106 which can optionally comprise anti-UCE module 108 as well as other email security services such as anti-virus and other convenience features such as web-mail which are well known in the art. In some implementations, anti-mail flood module 102 can receive information from anti-UCE module 108. The anti-mail flood module 102 serves as a gate between mail system 106 and the outside world.

Figure 2A:
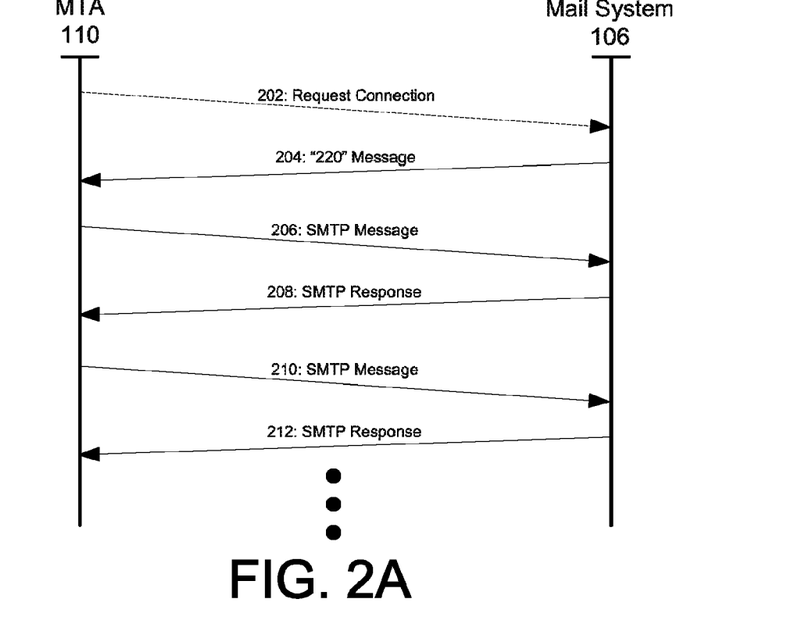
FIG. 2A depicts the communication flow for the initial stages of an SMTP session.
Figure 2B:
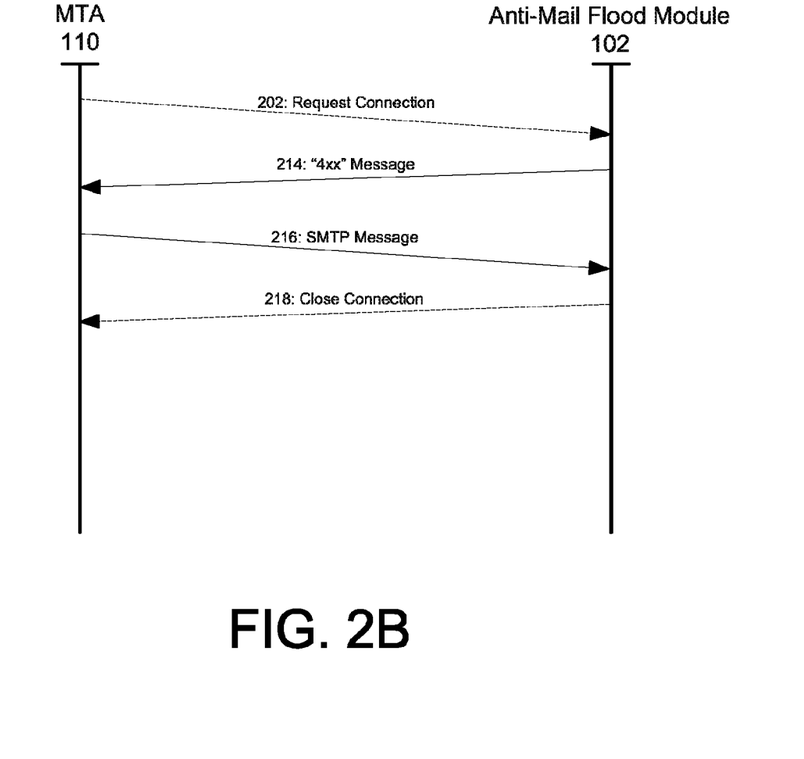
FIG. 2B depicts the communication flow for an SMTP session when an anti-mail flood module is used to protect a mail system.

FIG. 2A depicts the communication flow for the initial stages of an SMTP session. Remote MTA 110 request a connection at 202 to mail system 106 which is listening on a port, commonly TCP/IP port 25. Upon a successful connection, mail system 106 responds with a "220" reply message at 204, indicating that mail system 106 is ready to accept an SMTP transaction. At this point MTA 110 and mail system 106 exchange SMTP messages and SMTP relays at 206, 208, 210, 212 and so forth. This exchange continues until the SMTP transaction is complete FIG. 2B depicts the communication flow for an SMTP session when anti-mail flood module 102 is used to protect mail system 106. If the connection request by MTA 110 is determined not to require preemption as described below, the SMTP transaction is handed over to mail system 106. However, if preemption as described below is required, then the connection request by MTA 100 anti-mail flood module 102 issues a "400" series reply at 214, which according to the SMTP protocol indicates a temporary failure and that MTA 100 should try again later. MTA 100 should issue a "QUIT" message at 216 and anti-mail flood module 102 may wait for the message or terminate the connection immediately upon issue of the "400" series reply. In either case, to prevent a spammer from tying up anti-mail flood module 102, the connection should be terminated regardless of whether or not the message sent at 216 is a "QUIT" message.

The anti-mail flood module either relays or monitors SMTP traffic between an external mail transfer agent (MTA) connected through public computer network 104 and mail system 106. Upon the inception of a network connection from the external MTA, the anti-mail flood module makes a simple determination as to whether the incoming message is a likely UCE candidate based on its IP address. If the incoming mail message is a likely UCE candidate the address is checked against a restriction policy and depending on the policy the incoming mail message is permitted to be processed or the connection is terminated. Particularly when the anti-mail flood module is configured to be a relay, it can intercept the connection and issue a temporary failure as described in FIG. 2B. The advantage is that there is verbatim compliance with the SMTP protocol and all connections are terminated with the appropriate responses. Furthermore, it insures that if the transmitting MTA is actually attempting to deliver a legitimate email message, it will continue to try at a later time. The determination as to which IP addresses are a likely UCE candidate should be performed as quickly as possible. The fact that a temporary failure is issued permits recovery of a legitimate email message in the event it is miscategorized by this determination.

Several embodiments of the anti-mail flood module are described in greater detail. While each of the embodiments is described in terms of a relay, as disclosed above, it can operate as a monitoring agent with a connection breaking capability, that is when a failure is to be issued due to the determination of the anti-mail flood module, the anti-mail flood module can intercept the SMTP transaction and issue the failure. Still in another implementation, the anti-mail flood module can monitor incoming email requests or even be queried by the mail server and rather than intervene directly, the anti-mail flood module can cause the mail server to issue a failure. Therefore, in the description of the various embodiments below, when the anti-mail flood module is described as issuing a temporary failure, it should be taken to include implementations where the anti-mail flood module intercepts an email request and sends a temporary failure message or where the anti-mail flood module causes a mail server that is processing an email request to issue a temporary failure message. In addition, the techniques and steps in each embodiment can be combined in their various combinations.

In the first embodiment, a database or list of address classes of known questionable sources is provided; these address classes are one or more ranges of IP addresses. In some implementations, each address class can represent the network of an Internet service provider (ISP) with the legitimate mail exchangers removed. In other implementations, an address class could be the class A, B or C address of a spammer that has been seen before. Other class definitions will no doubt be clear to one of ordinary skill. Assigned to each class is the maximum number of permitted simultaneous connections. Examples of method determining address classes are described in U.S. patent application Ser. No. 11/186,193 which is incorporated by reference herein in its entirety.

Figure 3:
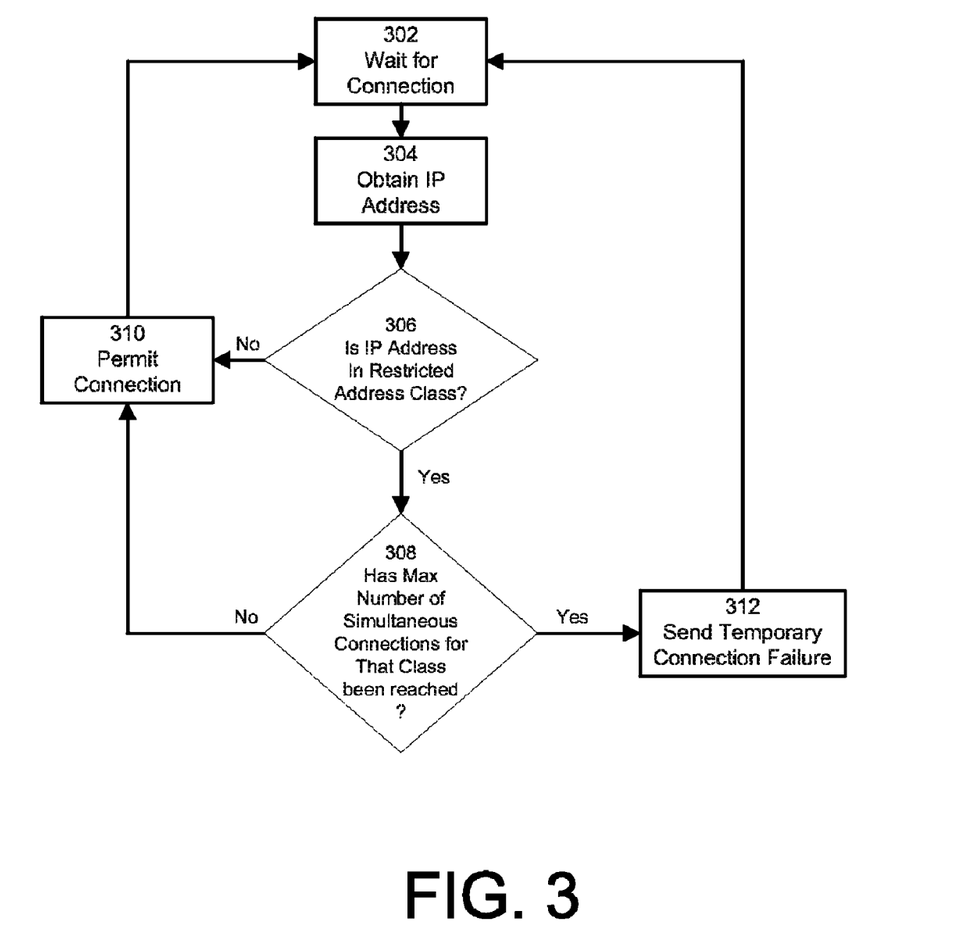
FIG. 3 shows a flowchart illustrating the operation of the anti-mail flood module according to the first embodiment.

FIG. 3 shows a flowchart illustrating the operation of the anti-mail flood module according to the first embodiment. At step 302, the anti-mail flood module waits for a new connection request by an external MTA. When a new connection is attempted by an external MTA, the IP address of the external MTA is determined at step 304. At step 306, a determination is made as to whether the IP address resides in an address class and if so which one. If the address does not belong to an address class, the SMTP transaction is permitted at step 310. If the address belongs to an address class, a determination is made as to whether the maximum number of permitted connection for that class has been reached at step 308. If the maximum is reached then a temporary failure issued at step 312. Otherwise the SMTP transaction is permitted at step 310. It is often desirable to set the maximum number of permitted simultaneous connections for each address class to one.

Figure 4:
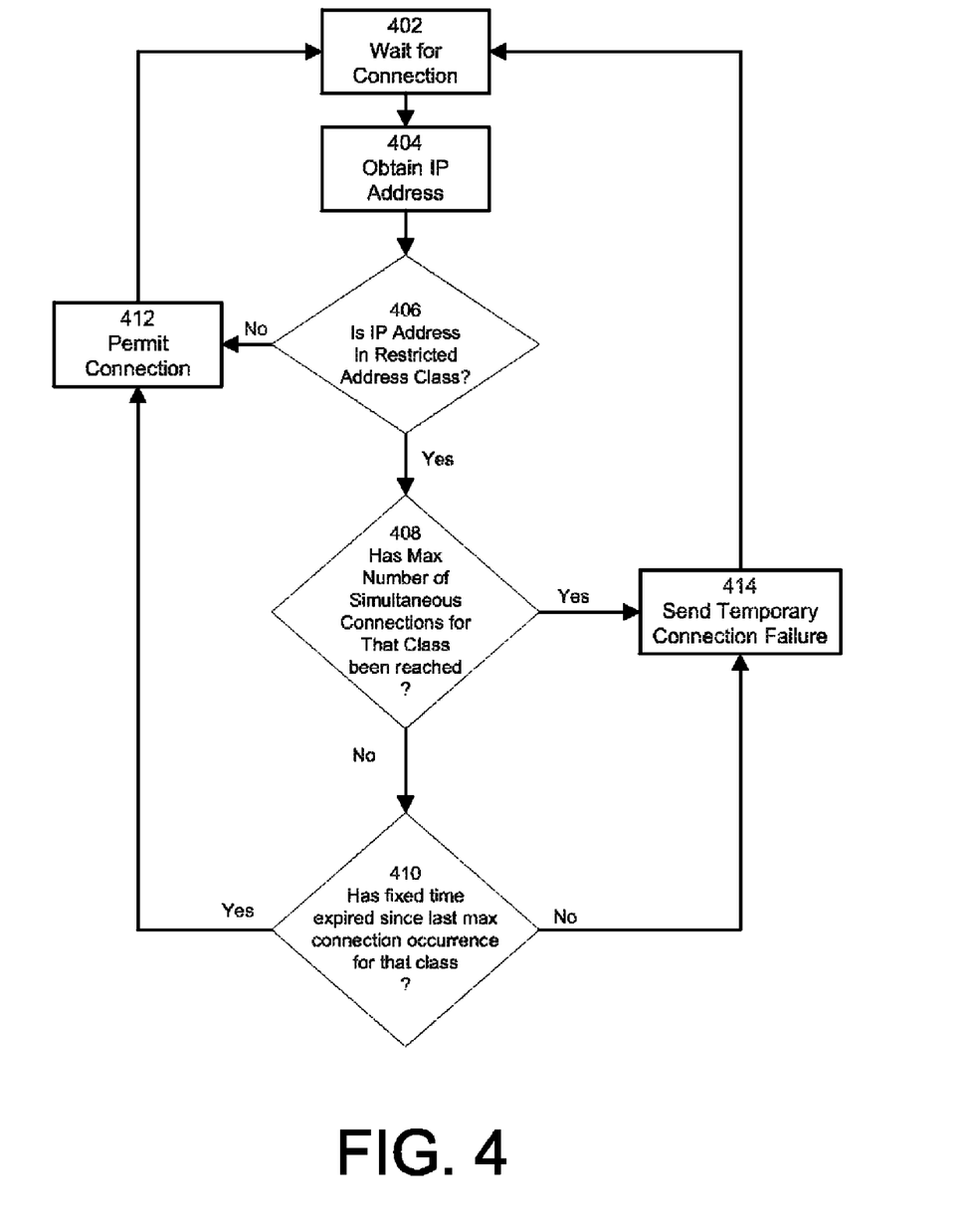
FIG. 4 shows a flowchart illustrating the operation of the anti-mail flood module according to the second embodiment.

FIG. 4 shows a flowchart illustrating the operation of the anti-mail flood module according to the second embodiment. In the second embodiment, a database or list as in the first embodiment is provided. At step 402, the anti-mail flood module waits for a new connection request by an external MTA. When a new connection is attempted by an external MTA, the IP address of the external MTA is determined at step 404. At step 406, a determination is made as to whether the IP address resides in an address class and if so which one. If the address does not belong to an address class, the SMTP transaction is permitted at step 412. If the address belongs to an address class, a determination is made as to whether the maximum number of permitted simultaneous connections for that class has been reached at step 408. If the maximum is reached then a temporary failure is issued at step 414. Otherwise, at step 410, a determination is made as to whether the time that has elapsed since the last time the maximum is reached is less than a predetermined time interval, and in such a case, a temporary failure is issued at step 414. Otherwise the SMTP transaction is permitted at step 412. This embodiment can be described as a "shield" protecting the mail system from a particular address class. If the maximum number of connections for that class is reached the "shield" is activated. The shield lingers for a predetermined time interval even after the number of connections from that address class drops below the maximum number.

Figure 5:
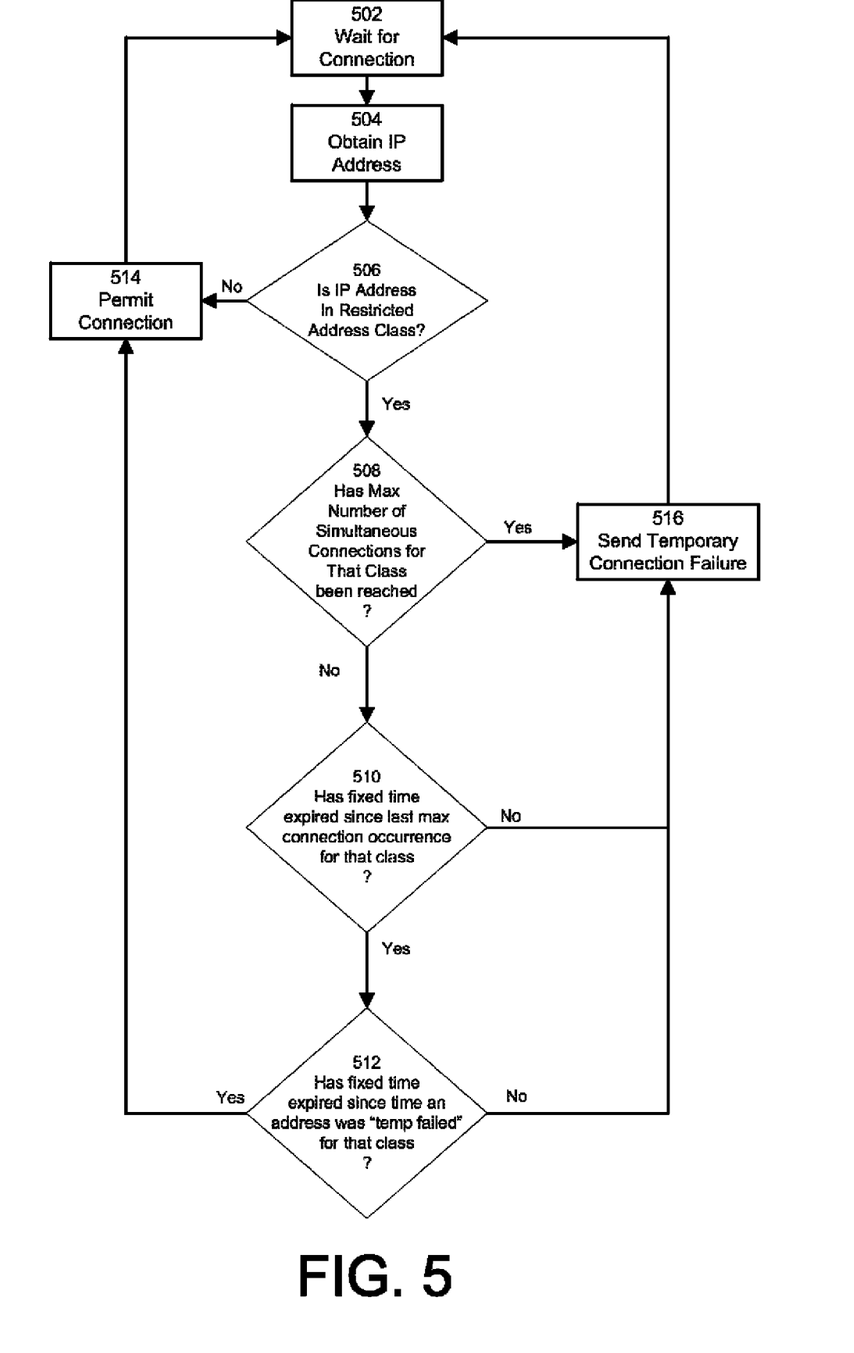
FIG. 5 shows a flowchart illustrating the operation of the anti-mail flood module according to the third embodiment.

FIG. 5 shows a flowchart illustrating the operation of the anti-mail flood module according to the third embodiment. In the third embodiment, a database or list as in the first embodiment is provided. At step 502, the anti-mail flood module waits for a new connection request by an external MTA. When a new connection is attempted by an external MTA, the IP address of the external MTA is determined at step 504. At step 506, a determination is made as to whether the IP address resides in an address class and if so which one. If the address does not belong to an address class, the SMTP transaction is permitted at step 514. If the address belongs to an address class, a determination is made as to whether the maximum number of permitted simultaneous connections for that class has been reached at step 508. If the maximum is reached then a temporary failure is issued at step 516. Otherwise, a determination is made at step 510 as to whether the time that has elapsed since the last time the maximum is reached is less than a predetermined time interval. If so at step 516 a temporary failure is issued. Otherwise, a determination is made at step 512 as to whether the time that has elapsed since the last time a temporary failure has been issued for this address class is less than a predetermined time interval. If so at step 516 a temporary failure is issued. Otherwise, the SMTP transaction is permitted at step 514. This embodiment can be described as a "shield" as in the second embodiment, however, in addition to lingering for a predetermined time interval after the number of connections from that address drops below the maximum number, each attempt to penetrate the shield keeps the shield alive for at least another predetermined interval. For both of the preceding embodiments a predetermined interval of about five minutes has been seen to be effective at curbing mail flood attacks.

In an alternative version, the anti-mail flood module can operate in the same fashion as any of the three preceding embodiments. In addition, when an SMTP transaction is permitted and the address of the sending MTA for that transaction is not within an identified address class, the anti-mail flood module receives an indication from anti-UCE module 108 as to whether or not the permitted message was a legitimate electronic mail message. If it is a UCE, an address class is defined for the IP address of the sending MTA for the UCE. This class can be a single address, the class A, B, or C address containing the single address, or some range derived from the single address, such as addresses sharing the most significant n bits. This new class is added to the database or list either permanently or for a predetermined period of time. It should be noted in such a configuration, the database or list of address classes can start out empty and get populated as the module runs.

Figure 6:
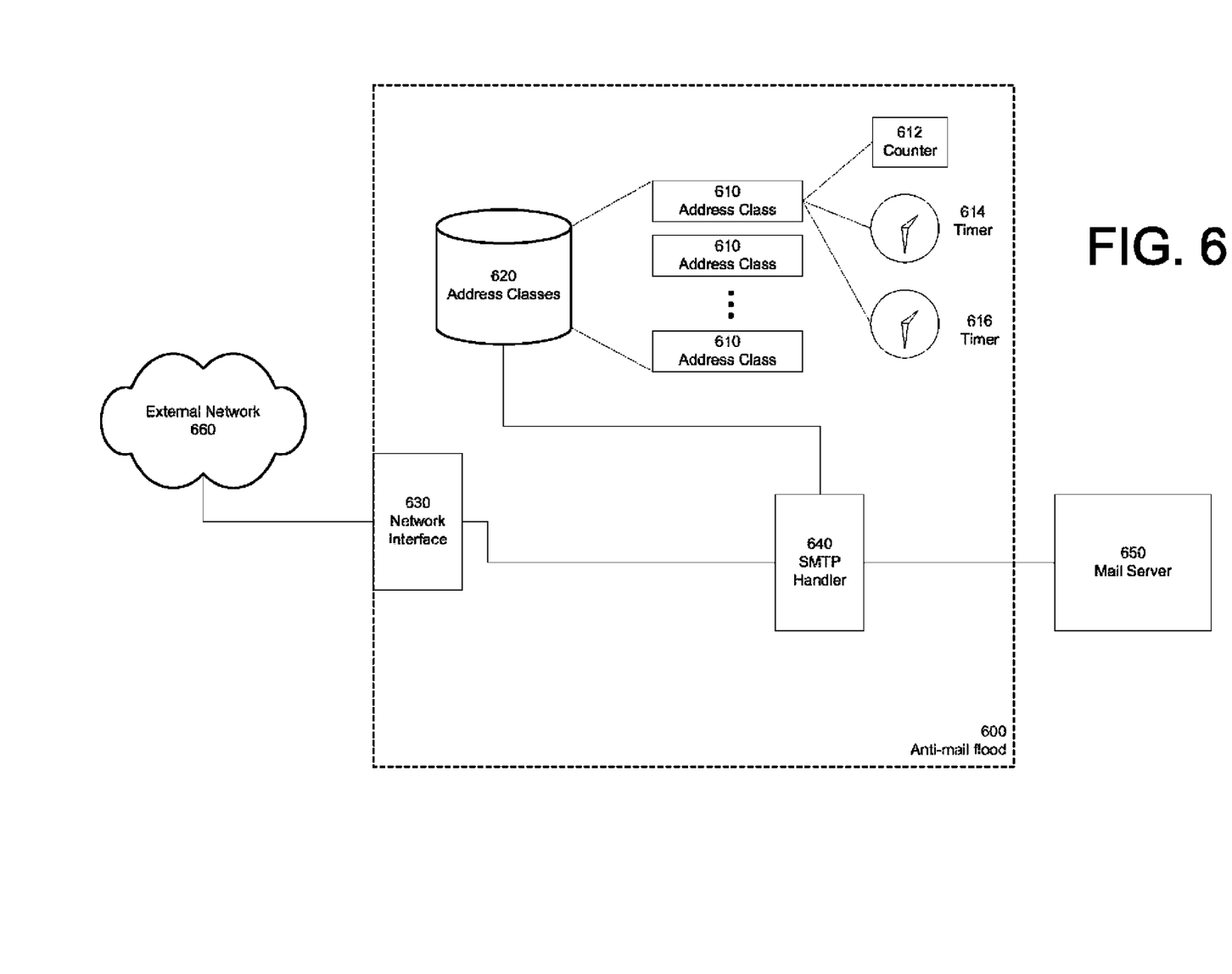
FIG. 6 depicts a functional block diagram of the anti-mail flood module.

FIG. 6 depicts a functional block diagram of the anti-mail flood module. While depicted in separate functional blocks, in practicality most of anti-mail flood module 600 is likely implemented and integrated into a single software module. For clarity, anti-mail flood module 600 is depicted as a collection of discrete functional blocks.

In one embodiment of the anti-mail flood module, an email request is received from external network 660, for example, the Internet, by network interface 630. The SMTP protocol is handled by SMTP handler 640 which also determines whether the IP address from which the email request is received is in collection 620 of address classes. Collection 620 can be implemented as a database, or a list of address ranges, or logic based rules such as whether the address is in the same subnet (network sharing a common most significant n bits) as a known spammer. If the IP address is not in collection 620, the email request is relayed to mail server 650 which completes the email transaction. Each address class 610 has counter 612 associated with it. This counter keeps track of the total number of simultaneous connections to address class 610. In the alternative, a list of current connections can be kept by anti-mail flood module 600 and the number of simultaneous connections can be counted. Counter 612 is used to determine whether the predetermined number of allowed connections from address class 610 has been reached. If the predetermined number has been reached, SMTP handler 640 sends a temporary failure to the email sender and does not permit mail server 650 to receive any more communications from the sender. Depending on the implementation, SMTP handler 640 can be configured not to send anything to mail server 650 until it has been determined that no mail flood attack is taking place.

Additionally, in another embodiment of the invention timer 614 is associated with address class 610. Timer 614 is used to track the duration of time since the counter 612 has reached the maximum number of allowed connections from address class 610. If this time interval is less than a predetermined threshold, SMTP handler 640 sends a temporary failure as described above. In yet another embodiment of the invention timer 616 is associated with address class 610. Time 616 is used to track the duration of time since the last time a temporary failure was issued by the SMTP handler 640 for address class 610. If this time interval is less than a predetermined threshold, SMTP handler 640 sends a temporary failure as described above.

Figure 7:
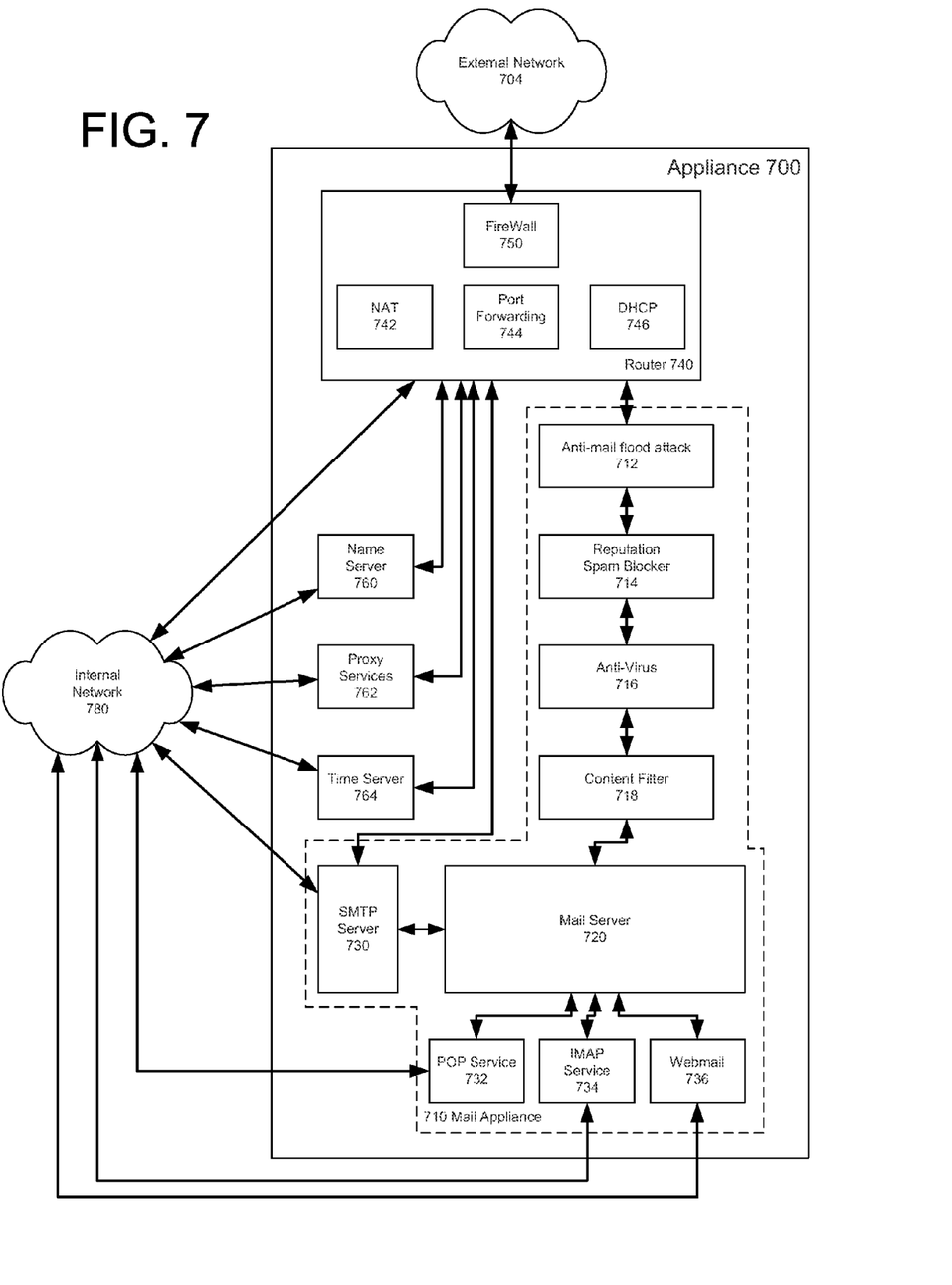
FIG. 7 is a block diagram depicting how an anti-mail flood attack component can be integrated into a mail appliance or even more generally a network appliance offering a variety of electronic mail and network services.

FIG. 7 is a block diagram depicting how an anti-mail flood attack component can be integrated into a mail appliance or even more generally a network appliance offering a variety of electronic mail and network services. In this example, a vast variety of services are offered. Mail appliance 710 comprises anti-flood attack component 712 and can comprise one or more of the services illustrated. For example, mail appliance 710 can further comprise reputation spam blocker 714, anti-virus module 716 and a content filter 718. Though depicted in a certain order, anti-flood attack component 712, reputation spam blocker 714, anti-virus module 716, and content filter 718 can in principle be placed in any order and can even be placed in parallel. Furthermore, mail appliance 710 can further comprise a mail server 720, which receives incoming email and can comprise user mailboxes, and/or an SMTP server 730 for sending out email using the SMTP protocol. It can also comprise POP service 732, IMAP service 734, and/or Webmail module 736.

Mail appliance 710 can be a stand alone appliance or can be incorporated into network appliance 700 which can comprise NAT 742, Port Forwarding Service 744, and/or DHCP services 746, which are often integrated into a router such as router 740. Furthermore, appliance 700 can also comprise firewall 750, which can be coupled to external network 790, such as the Internet. Firewall 750 is sometimes also integrated into a router such as router 740. In addition to the services within router 740 and mail appliance 710, appliance 700 can also comprise timeserver 764, proxy services 762, which can include http, ftp and socks 5 proxies, and nameserver 760. Generally, all these services are supplied for the benefit of users on internal network 780. For instance, a user coupled to internal network 780 can use mail appliance 700 to send and receive email. He can obtain time synchronization from timeserver 764. He can use a proxy among proxy services 762, resolve host names with nameserver 760, and obtain an IP address through DHCP service 746. Most other network services can further be integrated into appliance 700.

Other embodiments and uses of the invention will be apparent to those skilled in the art from consideration of the specification and practice of the invention disclosed herein. Although the invention has been particularly shown and described with reference to several preferred embodiments thereof, it will be understood by those skilled in the art that various changes in form and details may be made therein without departing from the spirit and scope of the invention as defined in the appended claims.

What is claimed:

1. A method for controlling electronic mail flood attacks comprising:
   when an email request originated from a suspicious address class contained in a set of suspicious address classes, wherein the address class comprises a collection of at least one IP address,
   determining a count of active connections originating from the suspicious address class,
   determining a first interval of time since the count of connections has reached the predetermined number, and
   determining a second interval of time since a temporary failure was last issued to an email message originating from the suspicious address class; and
   when at least one of a set of at least one failure criteria is met, issuing a temporary failure message to the email request,
   wherein the set of at least one failure criteria comprises a first criterion which is met when the count of active connections reaches a predetermined maximum number, a second criterion which is met when the first interval is less than a first predetermined interval of time, and a third criterion which is met when the second interval is less than a second predetermined interval of time.

2. The method of claim 1, wherein the predetermined maximum number is one.

3. The method of claim 1, wherein the second predetermined interval is about 5 minutes.

4. The method of claim 1, wherein the suspicious address class comprises all IP addresses belonging to an ISP from which a suspected unsolicited commercial email (UCE) originated.

5. The method of claim 1, wherein the suspicious address class comprises all IP addresses excluding legitimate mail exchangers belonging to an ISP from which a suspected UCE originated.

6. The method of claim 1, wherein the suspicious address class comprises all IP addresses sharing identical n most significant bits with an IP address from which a suspected UCE originated.

7. The method of claim 1, wherein the suspicious address class comprises a range of IP addresses.

8. The method of claim 1, wherein the set of suspicious address classes is stored in a database.

9. The method of claim 1 further comprising
   receiving an IP address from an anti-UCE means; and
   when the IP address does not belong to any suspicious address classes in the set of suspicious address classes, deriving a new suspicious address class based on the IP address and adding the new suspicious address class to the set of suspicious address classes.

10. A system for controlling electronic mail flood attacks comprising:
    a means for determining a count of active connections originating from a suspicious address class when an email request originated from a suspicious address class contained in a set of suspicious address classes, wherein the address class comprises a collection of at least one IP address;
    a means for determining a first interval of time since the count of connections has reached the predetermined number;
    a means for determining a second interval of time since a temporary failure was last issued to an email message originating from the suspicious address class; and a means for issuing a temporary failure message to the email request;
    wherein the temporary failure message is issued when the email request originated from a suspicious address class and when at least one of a set of at least one failure criteria is met, issuing a temporary failure message to the email request,
    said set of at least one failure criteria comprises a first criterion which is met when the count of active connections reaches a predetermined maximum number, a second criterion which is met when the first interval is less than a first predetermined interval of time, and a third criterion which is met when the second interval is less than a second predetermined interval of time.

11. The system of claim 10, wherein the predetermined maximum number is one.

12. The system of claim 10, wherein the second predetermined interval is about 5 minutes.

13. The system of claim 10, wherein the suspicious address class comprises all IP addresses belonging to an ISP from which a suspected unsolicited commercial email (UCE) originated.

14. The system of claim 10, wherein the suspicious address class comprises all IP addresses excluding legitimate mail exchangers belonging to an ISP from which a suspected UCE originated.

15. The system of claim 10, wherein the suspicious address class comprises all IP addresses sharing identical n most significant bits with an IP address from which a suspected UCE originated.

16. The system of claim 10, wherein the suspicious address class comprises a range of IP addresses.

17. The system of claim 10, wherein the set of suspicious address classes is stored in a database.

18. The system of claim 10, further comprising
    receiving an IP address from an anti-UCE means; and
    when the IP address does not belong to any suspicious address classes in the set of suspicious address classes, deriving a new suspicious address class based on the IP address and adding the new suspicious address class to the set of suspicious address classes.

19. An network appliance comprising:
    a module selected from the group consisting of a content filter, anti-virus means, anti-UCE means, anti-phishing means, POP server, IMAP server, webmail server and any combination thereof; and
    an anti-mail flood attack system comprising:

a means for determining a count of active connections originating from a suspicious address class when an email request originated from a suspicious address class contained in a set of suspicious address classes, wherein the address class comprises a collection of at least one IP address;

a means for determining a first interval of time since the count of connections has reached the predetermined number;

a means for determining a second interval of time since a temporary failure was last issued to an email message originating from the suspicious address class; and a means for issuing a temporary failure message to the email request;

wherein the temporary failure message is issued when the email request originated from a suspicious address class and when at least one of a set of at least one failure criteria is met, issuing a temporary failure message to the email request, said set of at least one failure criteria comprises a first criterion which is met when the count of active connections reaches a predetermined maximum number, a second criterion which is met when the first interval is less than a first predetermined interval of time, and a third criterion which is met when the second interval is less than a second predetermined interval of time.

20. The network appliance of claim 19 further comprising:
network modules selected from the group consisting of routers, dynamic host configuration protocol (DHCP) servers, port forwarding means, network address translation (NAT) means, firewall, name server, proxy server, and time server, and any combination thereof.

* * * * *